July 13, 1926.

J. S. ALLEN ET AL 1,591,950

MECHANICAL GEAR SHIFT

Filed June 30, 1924    3 Sheets-Sheet 1

Inventor
J.S. Allen
C.E. Broders

July 13, 1926.

J. S. ALLEN ET AL 1,591,950

MECHANICAL GEAR SHIFT

Filed June 30, 1924   3 Sheets-Sheet 3

Witness:
E.H.Wagner.

Inventor
J.S.Allen
C.E.Broders

By Robb Robb & Hill
Attorneys.

Patented July 13, 1926.

1,591,950

UNITED STATES PATENT OFFICE.

JOHN S. ALLEN, OF MADISON, AND CLAUDE E. BRODERS, OF WALDO, WISCONSIN, ASSIGNORS TO UNITED STATES AUTOMATIC SHIFT CO., OF MADISON, WISCONSIN, A CORPORATION.

MECHANICAL GEAR SHIFT.

Application filed June 30, 1924. Serial No. 723,248.

This invention consists of a novel construction of mechanism known in the automotive art today as a mechanical or automatic gear shift, the term automatic being used in the sense that the gear shifting instrumentalities to a certain extent act automatically as an incident to the operation of a manually actuated part or parts including primarily a foot operated clutch pedal.

A primary object of the invention has been to produce a mechanical gear shift of exceedingly simplified form, because the shifts which have heretofore been proposed have largely been of a rather complicated construction, giving rise to difficulties of operation and manufacture and rendering them of doubtful value from a commercial viewpoint.

A secondary object of the invention has been to produce a construction of shift of the type mentioned which is so simplified that its parts may be, with few exceptions, made from stock material, such as stock bars and plates.

There are a number of other objects of this invention which will be set forth more fully as the constructions and functions designed to meet the said objects are presented hereinafter.

Figure 1:
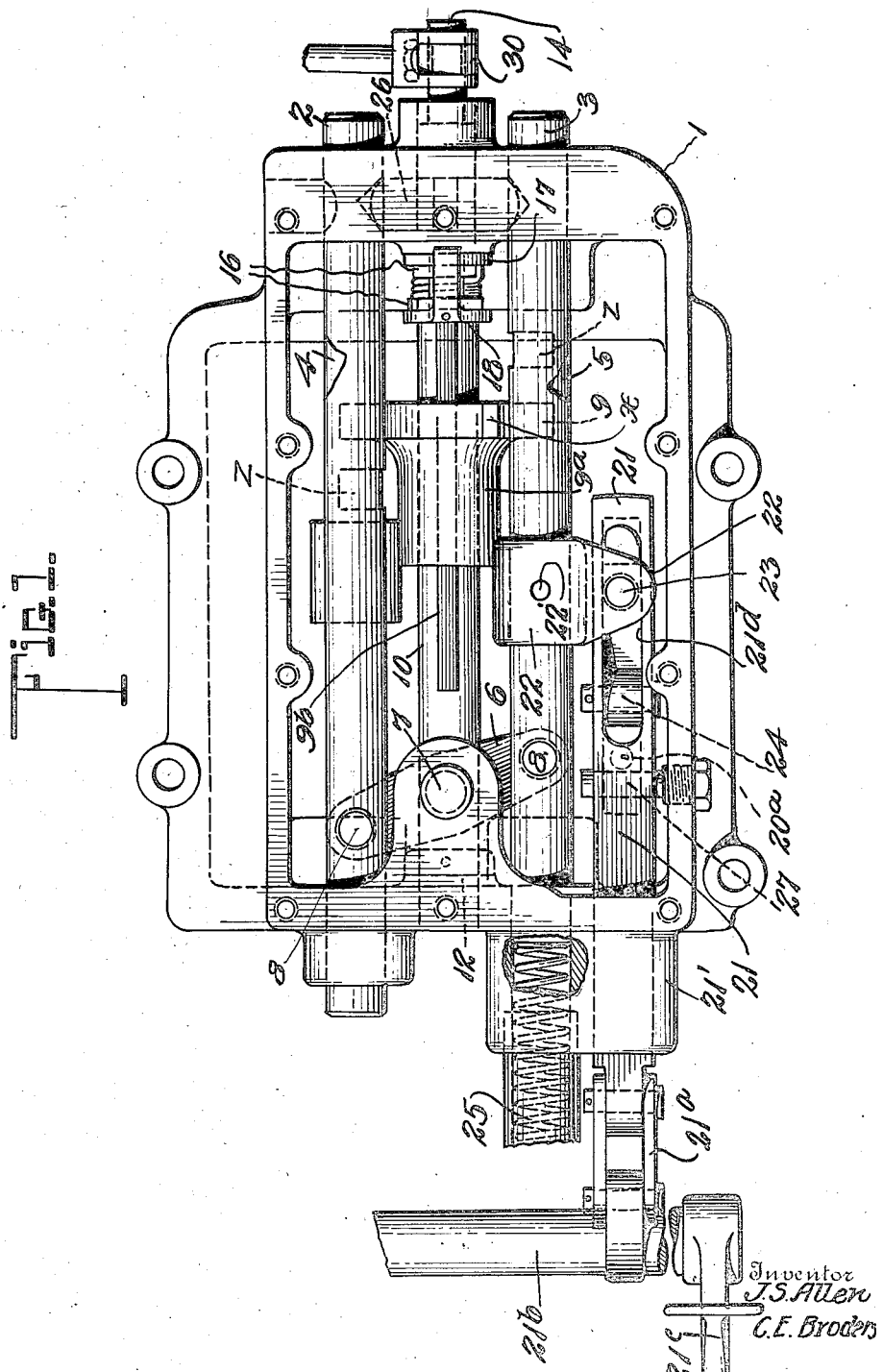
Figure 1 is a top plan view of a gear shift unit embodying the essential features of our invention.

It is essentially desirable in carrying out the invention that the mechanism thereof be mounted as a unit upon the transmission gear case or housing of any particular type of automobile with which the invention may be used. To this end practically all of the mechanism of our invention, excepting certain control connections leading to the steering wheel and to the clutch pedal, are assembled in a unitary casing or housing 1, which is preferably a casting of peculiar form. Mounted in this casing 1 is a series of sliding bars which will be designated for the purpose of this description as the actuating bars or slides 2 and 3, and the gear shifting bars or slides 4 and 5. The actuating slides 2 and 3 are connected together by means of a lever 6, the ends of which are pivotally connected to the slides 2 and 3 as shown at 8. The lever 6 is pivotally mounted upon a lug or arm 7 projecting from one end of the casing 1.

It being an essential object of the invention to simplify the selector principle of gear shifts of the type thereof, and it being known that in ordinary gear transmissions of automobiles there are two moving gears, each of which is shifted in opposite directions, we have made a simplified operating device for accomplishing the above work by the use of the slides 2 and 3 connected to move in opposite directions by the lever 6. It will be clear that as each of the slides 2 and 3 moves oppositely from what may be considered a neutral or normal position, and it will be evident that the gear shifting slides 4 and 5 may be readily provided with forks to engage the moving gears of any ordinary automobile transmission, and the proper movements imparted to the slides 4 and 5 to obtain four positions of said two movable gears, whereby the adjustments of the gears to reverse, low, intermediate and high speed positions may be obtained.

To the above end we provide a very simple and peculiarly arranged and operating selector 9 which consists of a disc having a hub 9$^a$ and mounted by a feather and spline connection 9$^b$ upon the selector shaft 10.

The shaft 10 is mounted in suitable bearings in the ends of the casing 1, and the selector 9 is adapted to slide longitudinally of the shaft independently thereof, and turn with the shaft when the shaft is turned for adjustment purposes in making different selections.

One end bearing for the shaft is designated at 12, and said shaft may be said to be of a two part construction, in that it is provided with an operating end section 14 projecting from the right-hand end of the casing 1. The two sections of the shaft which are really denoted 10 and 14, according to the drawings, are connected together by a flexible connection, including parts 16, 17 and 18, which connection may be comprised of co-acting spring pressed plates or arms, yieldable so that the right end shaft section 14 may be adjusted for preselection action, while the body section 10 of the shaft remains stationary, the connecting parts 16, 17 and 18 permitting rotation of the shaft section 10 when it is released for such rotation by the selector 9 at a certain position in its operation. This position is the neutral position of the selector, as will appear more fully hereafter.

Figure 4:
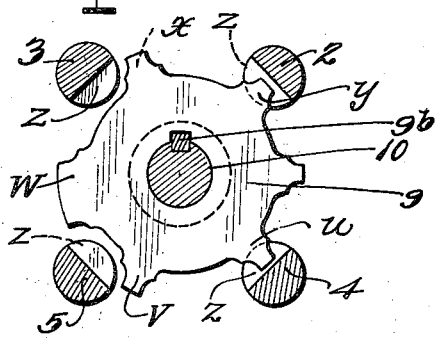
Figure 4 is a diagrammatic view showing clearly the form of the selector and illustrating its relation to the actuating gear slides and the gear shifting slides.

In Figure 1 of the drawings the selector is disposed in its neutral position, as are also the actuating slides 2 and 3 and the gear shifting slides 4 and 5. Figure 4 of the drawings shows the formation of the selector 9 as having lugs $u$, $v$, $w$, $x$ and $y$. The lugs just mentioned are adapted to enter notches which are formed on facing sides of the several slides 2, 3, 4 and 5 at a central point between which is located the shaft 10—14, and the selector 9. The notches of the slides 2, 3, 4 and 5 are generally designated at Z, and in its neutral position the selector 9 is located centrally between the notch $z$ of slide 2 and the notch $z$ of slide 3 as the parts are seen in Figure 1. As a means for operating the actuating slides 2 and 3 we employ an operating bar 21 adapted to slide longitudinally through one end of the casing 1 where a long bearing 21' is provided for said bar. The bar 21 is connected by linkage 21$^a$ with a rock shaft 21$^b$ on which the clutch pedal 21$^c$ is carried and by which it is rocked. The bar 21 is connected by suitable means, to be hereinafter set forth, with a yoke 22 rigidly attached at 22' to the actuating slide 3 and offstanding laterally therefrom. The yoke 22 has a downwardly extending pin 23 adapted to be engaged by a dog 20 pivoted at 24 to the bar 21 and having a nose adapted to engage and disengage with respect to the pin 23. Normally a spring 20$^a$ tends to force the dog 20 into engagement with the pin 23 and such engagement is maintained, although sometimes the nose of the dog engages the pin and sometimes a flat 20$^b$ on the upper side of the dog engages said pin. A pin and slot connection between the slide 3 and the sliding bar 21 is provided because the pin 23 enters a long slot 21$^d$ in the bar 21. The dog 20 is mounted to operate on the pin 23 at its nose portion and has a flat 20$^b$ in said slot.

Mounted beneath the dog 20 and the bar 21 is a horizontal camming pin 27 which is adapted to engage the under side of the dog, the latter being formed with a cam 35 at said underside, and also engages with a recess 36.

With the foregoing features of construction in mind it is notable that we achieve a special object in regard to the intermeshing of the gears of the transmission for different gear transition operations. By the use of the dog 20 and features of construction in conjunction therewith, we are enabled to prevent a racking of gears as they mesh, because at the final movement of the shifted gear the dog 20 is kicked off from the pin 23 just prior to the operative engagement of the clutch so there is no liability of an engagement of the clutch taking place before the gears are fully enmeshed.

The general operation of our invention will now be set forth. Supposing the parts to be in the neutral positions of Figure 1, the selector lever at the steering wheel may be moved to a reverse position, designated thereon, at any time for selecting the reverse gear transition of the transmission mechanism. The clutch pedal 21$^c$ is then depressed and the selector disc or member 9 which is locked against rotation by the several slides when at neutral adjustment, is free to rotate as soon as the pedal 21$^c$ is fully depressed. The depressing action of the pedal moves the bar 21 to the left in Figure 1, the slide 3 to the left, and the slide 2 to the right, simultaneously until the notches $z$ of slides 2 and 3 are opposite one another and opposite the selector member or disc 9. At such time the selector 9 becomes operative to turn under the influence of the preselected reverse gear transition action set up by movement of the arm 30 attached to the shaft section 14. Of course the shaft section 14 turned to the reverse gear position in the above action by the shaft section 10 remained stationary because the selector 9 could not turn to do its selecting work until the clutch pedal was depressed. We will assume now that the gear slides 2 and 3 have been brought to their neutral positions, whereupon certain lugs on the selector, namely, lugs $y$ and $u$, will connect the slides 2 and 4 together. Obviously, these slides being connected as soon as the pedal 21$^c$ is released the slide 2 will move to the left and the slide 3 will move to the right, and as the slide 3 is connected to the slide 4, the slide 4 will be moved to the right and cause the reverse gear transition to be completed. When the gear transition is completed, as stated, it cannot be disturbed because the selector 9 is locked against movement by the bars 2, 3, 4 and 5 presenting unnotched portions to the lugs of the selector, excepting those lugs which have already been engaged with the slides 3 and 4. We thus obtain a self locking action of the selector incident to its operation to effect a gear engaging action. Suppose it is desired to set up the low speed transition. The clutch pedal 21$^c$ is operated as usual to depress it and actuate the slides 2 and 3 in opposite directions. The first result is that the slides 2 and 3 are carried to neutral positions, thereby unshipping the reverse gear engagement, and as soon as the neutral positions have been reached by the parts 2 and 3 the selector 9 can readily turn so as to engage certain of its lugs with the slides 2 and 4. Under these conditions the slide 4 will be carried in the direction opposite that just described above, establishing the low speed gear transition operation. If it is now desired to obtain intermediate or high speed gear connections the clutch pedal is depressed as usual and the slide 5 will be moved in one direction or the other, depending on whether the speed to be selected is either intermediate or high. The selections are created, of course, by interlocking the slides 4 and 5 to move in either direction by the influence of the slides 2 and 3, the movements of which are always definite and invariable upon action of the clutch pedal.

Figure 2:
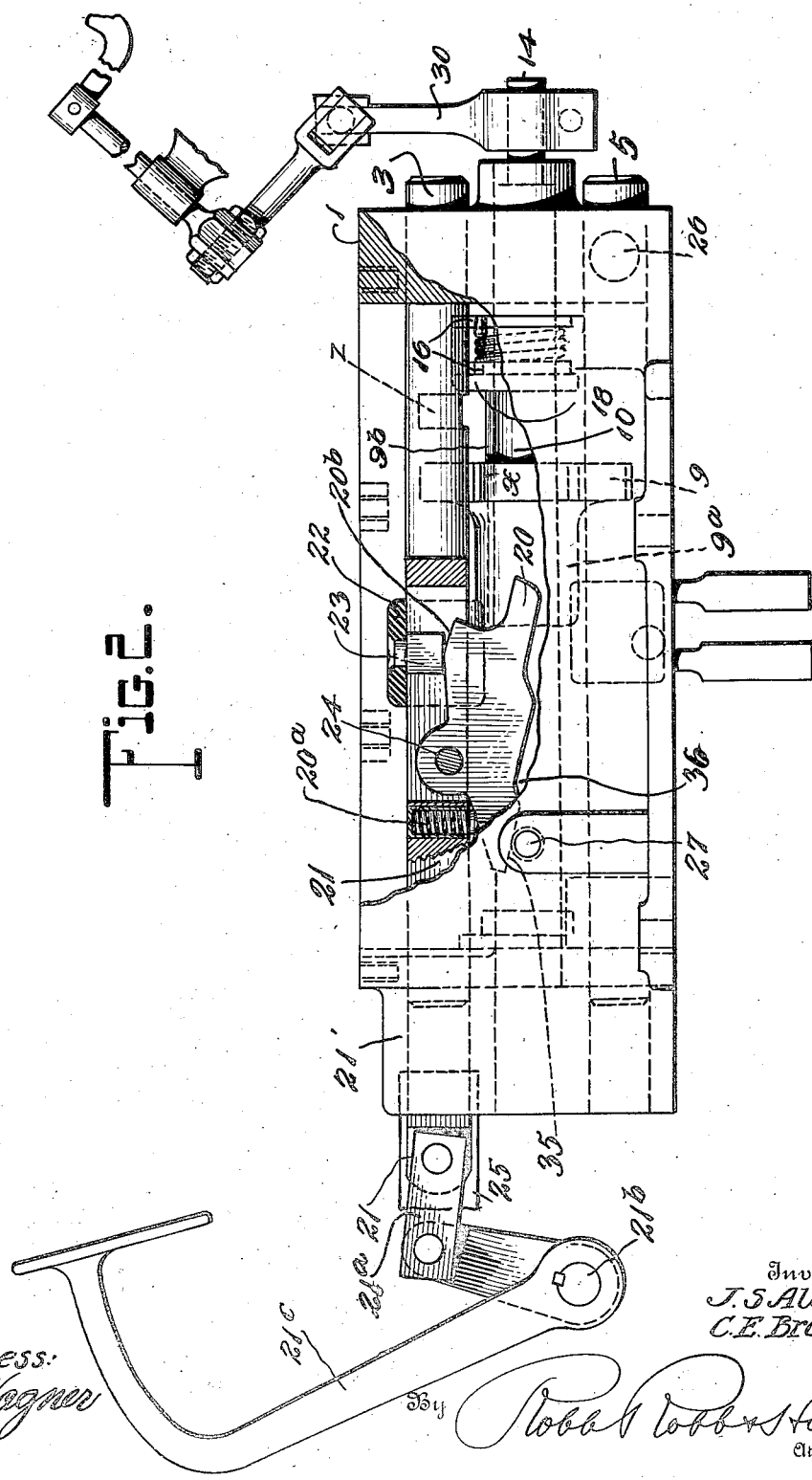
Figure 2 is a side view illustrating the clutch pedal and selector control connections with the shift.
Figure 3:
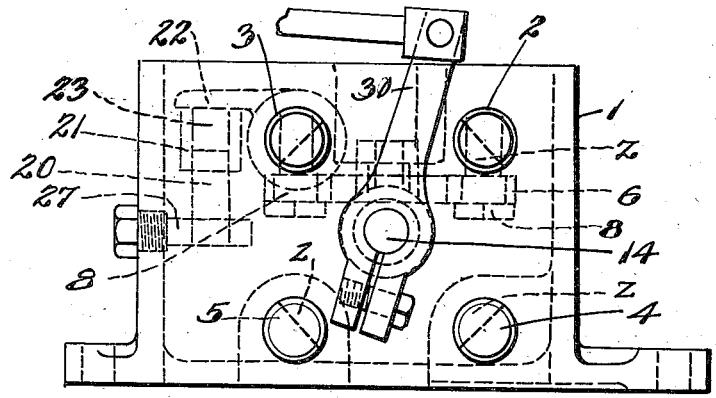
Figure 3 is an end view of the shift unit proper.

Reverting now to the operation of the dog 20 in conjunction with the pin 23, it is noted that as the clutch pedal is depressed to carry the bar 21 to the left in Figures 1 and 2, the dog 20 is moved leftward from its position of Figure 2, until the cam 35 rides off of the pin 27 and the recess 36 reaches a point above the pin, thereby permitting the spring 20ᵃ to force the nose of the dog into engagement with the left side of the pin 23 as the clutch reaches its final depressed position. Release of the clutch pedal, of course, means that the spring acting on the clutch pedal will carry the clutch in and the motion of the clutch and its pedal under the influence of the spring is transmitted to the bar 21 to carry it to the right. Under these conditions the dog which is positively engaged at its nose with the pin 23 positively moves the yoke 22 and slides 2 and 3, and either of the slides 4 and 5 connected with the former, to perfect the gear transition operation. As the bar 21 approaches its limit of rightward movement the tail of the dog engages the pin 27 at the cam 35 and the dog is cammed downwards at its nose portion, so that after the gears are meshed and before the clutch is fully in the dog escapes from the pin 23. There is no liability, therefore, of the clutch establishing a drive upon the gears of the transmission before they are fully meshed. If desired a light spring may be used to engage the left-hand end of the slide 3, by being mounted in a tube 25 having an outer closed end and screwed on the left-hand end of the casing 1 in alignment with the said slide 3. Then this spring may be relied upon to carry the gears into final mesh under the influence of actuation of the members 2 and 3 and said light spring, notwithstanding that the action of the clutch and its spring is removed by the escapement of the dog 20 from its engagement with the pin 23. Obviously, with the dog and pin feature just described the gear shifting parts are adapted to remain stationary if it happens that the gear teeth of the gears to be meshed do not register, the meshing taking place independently of the final return movement of the clutch, and the positive action of the clutch to force a meshing operation which is not ready to be completed being thus removed.

Having thus described our invention what we claim as new and desire to secure by Letters Patent is,

1. In a mechanical gear shift, in combination, a pair of oppositely movable actuating slides, clutch operating means adapted to operate said slides, a pair of gear shifting slides, a selector disposed in the space around which said slides are grouped, and means to operate the selector to interlock either actuating slide with either gear shifting slide to move the latter in either direction.

2. In a mechanical gear shift, in combination, a pair of oppositely movable actuating slides, clutch operating means adapted to operate said slides, a pair of gear shifting slides, a selector disposed intermediate said slides, means to interlock either actuating slide with either gear shifting slide to move the latter in either direction, the selector being common to all of the slides and rotatable to engage them as above stated.

3. In a mechanical gear shift, in combination, a pair of oppositely movable actuating slides, clutch operating means adapted to operate said slides, a pair of gear shifting slides, a selector disposed intermediate said slides to interlock either actuating slide with either gear shifting slide to move the latter in either direction, the selector being common to all of the slides and rotatable to engage them as above stated, together with means to rotate the selector to accomplish its selecting function, and means connecting the selector with the last mentioned means so that the selector may operate independently thereof to accomplish its actuating function, whereby gear engaging operations of the gear shifting slides are effected.

4. In a mechanical gear shift, in combination, a pair of actuating slides movable in opposite directions, means for imparting such movement to said slides, gear shifting slides movable in either of opposite directions, a shaft, a selector rotatable with said shaft and slidable thereon, means on the said several slides whereby the selector may be intermeshed with certain ones of them at a particular time, the selector cooperating with the slides so that it is locked against movement when the slides are in positions wherein the gear shifting slides are adjusted to maintain a certain gear meshing operation.

5. In a mechanical gear shift, in combination, actuating slides adapted to move from and back to a certain position, means connecting the slides so that they move in opposite directions, gear shifting slides adapted to move in either direction from a central neutral position, and a selector having peripheral lugs to interlock either of said gear shifting slides with either of the actuating slides.

6. In a mechanical gear shift, in combination, actuating slides adapted to move from and back to a certain position, means connecting the slides so that they move in opposite directions, gear shifting slides adapted to move in either direction from a central neutral position, a selector to interlock either of said gear shifting slides with either of the actuating slides, and comprising a disc having peripheral members to co-act with the slides, a shaft for turning said disc to effect a selecting operation, and means connecting the disc with the shaft permitting it to move on the shaft independently of its movement by the shaft.

7. In a mechanical gear shift, in combination, actuating slides adapted to move from and back to a certain position, means connecting the slides so that they move in opposite directions, gear shifting slides adapted to move in either direction from a central neutral position, a selector to interlock either of said gear shifting slides with either of the actuating slides, and comprising a disc having peripheral members to co-act with the slides, a shaft for turning said disc to effect a selecting operation, means connecting the disc with the shaft permitting it to move on the shaft independently of its movement by the shaft, said shaft being made in two parts, and an elastic connection between the two parts thereof, whereby one part of the shaft may be set to a selecting position, while the other part is stationary, thus accommodating for a delayed selector action of the selector.

8. In a mechanical gear shift, in combination, actuating slides movable in opposite directions, gear shifting slides movable in two directions from a central neutral position, a selector for establishing different operating connections between actuating slides and the gear shifting slides, and comprising a rotative member, a shaft carrying the rotative member, and comprising a section having a resilient connection therewith, and selector control means connected with said shaft section to preset it for a selection while the shaft is stationary with the selector.

9. In a gear shifter, in combination, a pair of actuating slides, two gear shifting slides, a selector to selectively connect certain ones of the said slides together, the slides and selector being so disposed that the slides abut with and prevent selecting movement of the selector whilst a shifting slide is in a position of gear engagement, means to shift the selector to effect gear shifting actions of the gear slides.

10. In a gear shifter, in combination, a pair of actuating slides, two gear shifting slides, a selector to selectively connect certain ones of the said slides together, the slides and selector having notches and lugs respectively, to interlock so the selector may actuate a gear shifting slide under the actuation of an actuating slide, means to rotate the selector to engage it or disengage it relatively to a pair of the above slides, and the slides acting to prevent turning of the selector when the slides are not at neutral.

In testimony whereof we affix our signatures.

JOHN S. ALLEN.
CLAUDE E. BRODERS.